(12) United States Patent
Yoshida et al.

(10) Patent No.: US 10,871,978 B2
(45) Date of Patent: *Dec. 22, 2020

(54) SERVER APPARATUS, IMAGE FORMING APPARATUS, INFORMATION PROCESSING APPARATUS, IMAGE FORMING CONTROL METHOD, AND IMAGE FORMING CONTROL PROGRAM

(71) Applicant: Sharp Kabushiki Kaisha, Sakai (JP)

(72) Inventors: Mayuko Yoshida, Sakai (JP); Takashi Sawano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,715

(22) Filed: Nov. 8, 2019

(65) Prior Publication Data

US 2020/0073688 A1 Mar. 5, 2020

Related U.S. Application Data

(63) Continuation of application No. 16/162,755, filed on Oct. 17, 2018, now Pat. No. 10,503,530, which is a (Continued)

(30) Foreign Application Priority Data

Jul. 11, 2016 (JP) ................................. 2016-136543

(51) Int. Cl.
*G06F 9/451* (2018.01)
*G06F 9/455* (2018.01)
*H04N 1/00* (2006.01)

(52) U.S. Cl.
CPC ..... *G06F 9/45512* (2013.01); *H04N 1/00408* (2013.01); *H04N 1/00421* (2013.01);
(Continued)

(58) Field of Classification Search
CPC .......... H04N 1/00421; H04N 1/00424; H04N 1/00427; H04N 1/00429; H04N 1/00464;
(Continued)

(56) References Cited

U.S. PATENT DOCUMENTS 7,676,116 B2 * 3/2010 Tamai ................ H04N 1/00472
382/305
9,081,533 B1 7/2015 West et al.
(Continued)

FOREIGN PATENT DOCUMENTS

CN 102236537 A 11/2011
JP 2015-125528 A 7/2015

OTHER PUBLICATIONS

Yoshida et al., "Server Apparatus, Image Forming Apparatus, Information Processing Apparatus, Image Forming Control Method, and Image Forming Control Program", U.S. Appl. No. 16/162,755, filed Oct. 17, 2018.

*Primary Examiner* — Negussie Worku
(74) *Attorney, Agent, or Firm* — Keating & Bennett, LLP

(57) ABSTRACT

A server apparatus provides a social networking service (SNS). The server apparatus stores a specific relation between a terminal apparatus and a printer that are allowed for communication using the SNS. The server apparatus stores relations between one or more icons and commands each corresponding to a respective one of the icons and including an image forming condition and an image forming instruction. Upon receiving a selected icon having been selected on the terminal apparatus, information indicating a selected printer having been selected on the terminal apparatus out of printers in specific relations with the terminal apparatus, and a piece of image data from the terminal apparatus, the server apparatus transmits a command corresponding to the selected icon and the piece of image data to the selected printer.

6 Claims, 16 Drawing Sheets

Related U.S. Application Data continuation of application No. 15/638,427, filed on Jun. 30, 2017, now Pat. No. 10,146,564.

(52) U.S. Cl.
CPC ..... *H04N 1/00424* (2013.01); *H04N 1/00427* (2013.01); *H04N 1/00429* (2013.01); *H04N 1/00464* (2013.01); *H04N 1/00466* (2013.01); *H04N 1/00474* (2013.01); *H04N 1/00482* (2013.01); *H04N 1/00501* (2013.01); *H04N 1/00973* (2013.01); *G06F 9/453* (2018.02); *H04N 1/00204* (2013.01); *H04N 2201/0094* (2013.01)

(58) Field of Classification Search
CPC ........... H04N 1/00466; H04N 1/00474; H04N 1/00501; H04N 1/00973; H04N 1/00244; H04N 21/4126; H04N 21/42203; H04N 21/4223; H04N 21/4394; H04N 21/44008; H04N 21/44222; H04N 21/4532; H04N 21/4755; H04N 21/4782; H04N 21/4882; H04N 21/8133; H04N 1/00307; H04N 1/00312; H04N 1/32106; H04N 1/32122; H04N 1/32776; H04N 1/32791; H04N 1/32793; H04N 1/4406; H04N 1/4433; H04N 2201/0039; H04N 2201/3207; H04N 2201/3208; H04N 2201/3209; H04N 2201/3233; H04N 2201/3246; H04N 1/0023; H04N 1/00832; G06F 9/453; G06F 9/45512; G06F 16/9535; G06F 3/1287; G06F 3/1222; G06F 3/1238; G06F 3/1288; G06F 3/1295; G06F 3/017; G06F 3/0481; G06F 3/04842; G06F 3/1204; G06F 3/1267; G06F 3/1273; G06F 3/1292; H04M 1/7253; H04M 1/72561; H04L 12/1822; H04L 12/189; H04L 67/1097
USPC .............................................. 358/1.15, 471
See application file for complete search history.

(56) References Cited

U.S. PATENT DOCUMENTS

| | | | | |
|---|---|---|---|---|
| 9,733,875 | B2* | 8/2017 | Sone | H04N 1/00127 |
| 10,146,564 | B2* | 12/2018 | Yoshida | H04N 1/00464 |
| 10,503,530 | B2* | 12/2019 | Yoshida | H04N 1/00482 |
| 2004/0156068 | A1* | 8/2004 | Yoshida | G06F 21/608 |
| | | | | 358/1.13 |
| 2007/0171450 | A1* | 7/2007 | Yoshida | G06F 3/0485 |
| | | | | 358/1.13 |
| 2010/0020363 | A1* | 1/2010 | Yoshida | H04N 1/00432 |
| | | | | 358/468 |
| 2011/0235085 | A1* | 9/2011 | Jazayeri | G06F 3/1206 |
| | | | | 358/1.14 |
| 2011/0261402 | A1 | 10/2011 | Yamamoto | |
| 2014/0365923 | A1* | 12/2014 | Lee | G06F 3/017 |
| | | | | 715/758 |
| 2015/0127675 | A1* | 5/2015 | Kim | H04N 21/42203 |
| | | | | 707/765 |
| 2015/0248263 | A1* | 9/2015 | Hattori | G06F 3/1285 |
| | | | | 358/1.15 |
| 2017/0041499 | A1* | 2/2017 | Saito | G06F 3/1238 |
| 2017/0171426 | A1* | 6/2017 | Park | H04N 1/00312 |
| 2017/0208181 | A1* | 7/2017 | Kim | H04N 1/0023 |

\* cited by examiner

SERVER APPARATUS, IMAGE FORMING APPARATUS, INFORMATION PROCESSING APPARATUS, IMAGE FORMING CONTROL METHOD, AND IMAGE FORMING CONTROL PROGRAM

BACKGROUND

1. Field

The present disclosure relates to a server apparatus that provides a social networking service (hereinafter referred to as an SNS) and an image forming apparatus, an information processing apparatus, an image forming control method, and an image forming control program that use the SNS.

2. Description of the Related Art

In recent years, as a form of social interaction via the Internet, many SNSs have come to be used. A user is able to use an SNS by installing dedicated application software to a terminal apparatus such as a personal computer, a smartphone (high function portable telephone), and a tablet terminal and registering an account to a server apparatus of the SNS that the user wishes to join.

Furthermore, in recent years, in terminal apparatuses as described above, manuscripts such as photographs have been handled more often, for example, in photographing, downloading a photograph provided over an SNS, downloading a photograph or an article from a website, and receiving a photograph attached to an e-mail. With this, improvement has been desired in operability when an image of a manuscript stored in the terminal apparatus is formed on a piece of paper.

For example, when an image forming instruction is made from a personal computer to an image forming apparatus, a printer driver is activated and various image forming conditions are set before the image forming instruction is made. The various image forming conditions include selection of an image forming apparatus, a paper size, an image forming mode, for example, color or monochrome, printed surfaces, for example, simplex or duplex printing, a layout, a number of copies, and the like.

Meanwhile, as a technique of executing an image forming instruction via an Internet communication line, a network system is proposed with which a setting detail of an image forming condition is described in a text of an e-mail by an HTML program and an image forming instruction of a file attached to the e-mail is executed in a terminal apparatus that has received the e-mail (for example, see descriptions related to FIGS. 6 and 7, in particular, in Japanese Unexamined Patent Application Publication No. 2006-23935).

Furthermore, an image forming apparatus is also proposed with which when an image forming instruction in a natural language is written in a micro-blog as a message to an image forming apparatus, this message is converted into a format processable by the image forming apparatus using a service provided over the Internet and the message after conversion is received, whereby image formation is performed (for example, see Japanese Unexamined Patent Application Publication No. 2014-49098).

However, the technique disclosed in Japanese Unexamined Patent Application Publication No. 2006-23935 attempts to simplify an image forming instruction at a receiving side of an e-mail. A transmitting side of the e-mail is not able to execute an image forming instruction when the transmitting side does not understand the description form of the HTML program. Furthermore, the program has to be described so as to set an image forming condition, such as a number of copies, an image forming mode, printing surfaces, and a layout, one by one. With this, the operability is not good.

With the technique disclosed in Japanese Unexamined Patent Application Publication No. 2014-49098 also, a message has to be described so as to set an image forming condition, such as specification of an image forming apparatus, a number of copies, printing surfaces, an image forming mode, and a postprocessing function, one by one. With this, the operability is not good.

It is desirable to provide a server apparatus, an image forming apparatus, an information processing apparatus, an image forming control method, and an image forming control program that are able to improve operability of setting of an image forming condition.

SUMMARY

A server apparatus according to the present disclosure provides a social networking service. The server apparatus includes a specific relation storage unit, a command storage unit, and a command transmission unit. The specific relation storage unit stores specific relations between a terminal apparatus and each of one or more image forming apparatuses, the terminal apparatus and the image forming apparatuses being able to be connected to the server apparatus via a communication line and being allowed to perform communication using the social networking service. The command storage unit stores relations between one or more icons and commands each corresponding to a respective one of the icons and including an image forming condition and an image forming instruction. Upon receiving a selection icon having been selected on the terminal apparatus out of the icons, information indicating a selected image forming apparatus having been selected on the terminal apparatus out of the image forming apparatuses having specific relations with the terminal apparatus, and a piece of image data used for forming an image in the selected image forming apparatus from the terminal apparatus, the command transmission unit reads out a corresponding command corresponding to the selected icon from the command storage unit and transmits the corresponding command and the piece of image data to the selected image forming apparatus.

An image forming apparatus according to the present disclosure is able to be connected to a server apparatus providing a social networking service via a communication line. The image forming apparatus includes a command storage unit, an image forming unit, and an image forming condition setting unit. The command storage unit stores relations between one or more icons and commands each corresponding to a respective one of the icons and including an image forming condition. The image forming unit forms an image on paper. Upon receiving any of the icons and a piece of image data from the server apparatus, the image forming condition setting unit reads out a corresponding command corresponding to the received icon from the command storage unit and causes the image forming unit to form an image based on the piece of image data under the image forming condition included in the corresponding command.

An information processing apparatus according to the present disclosure is able to be connected to a server apparatus providing a social networking service and each of image forming apparatuses forming an image on paper via a communication line. The information processing apparatus includes a command storage unit and a command transmission unit. The command storage unit stores relations between one or more icons and commands each corresponding to a respective one of the icons and including an image forming condition and an image forming instruction. Upon receiving any of the icons and a piece of image data from the server apparatus, the command transmission unit reads out a corresponding command corresponding to the received icon from the command storage unit and transmits the corresponding command and the piece of image data to the image forming apparatus.

An image forming control method according to the present disclosure includes selecting an image forming apparatus, selecting an icon, selecting a piece of image data, and forming an image. At the selecting an image forming apparatus, selection of an optional image forming apparatus out of one or more image forming apparatuses is received on a terminal apparatus. The image forming apparatuses and the terminal apparatus are able to be connected to a server apparatus providing a social networking service via a communication line. The image forming apparatuses are in specific relations allowing communication with the terminal apparatus using the social networking service. At the selecting an icon, each of one or more commands includes an image forming condition and an image forming instruction, and out of one or more icons each corresponding to a respective one of the commands, selection of an optional icon is received on the terminal apparatus. At the selecting a piece of image data, selection of a piece of image data used for forming an image in the selected image forming apparatus having been selected on the terminal apparatus is received on the terminal apparatus. At the forming an image, under an image forming condition corresponding to the selected icon having been selected on the terminal apparatus, the piece of image data is used for forming an image in the selected image forming apparatus.

An image forming control program according to the present disclosure is executed in a terminal apparatus being able to be connected to a server apparatus providing a social networking service via a communication line. The image forming control program causes the terminal apparatus to execute selecting an image forming apparatus, selecting an icon, selecting a piece of image data, and transmitting. In the selecting an image forming apparatus, a list of one or more image forming apparatuses being in specific relations allowing communication with the terminal apparatus using the social networking service is displayed and selection of an optional image forming apparatus out of the image forming apparatuses is received. In the selecting an icon, each of the one or more icons are associated with an image forming condition and an image forming instruction, the icons are displayed, and selection an optional icon out of the icons is received. In the selecting a piece of image data, selection of a piece of image data used for forming an image in the image forming apparatus having been selected in the selecting an image forming apparatus is received. In the transmitting, the icon having been selected in the selecting an icon, information indicating the image forming apparatus selected in the selecting an image forming apparatus, and the piece of image data having been selected in the selecting a piece of image data are transmitted to the server apparatus.

DESCRIPTION OF THE EMBODIMENTS

First Embodiment

Figure 1:
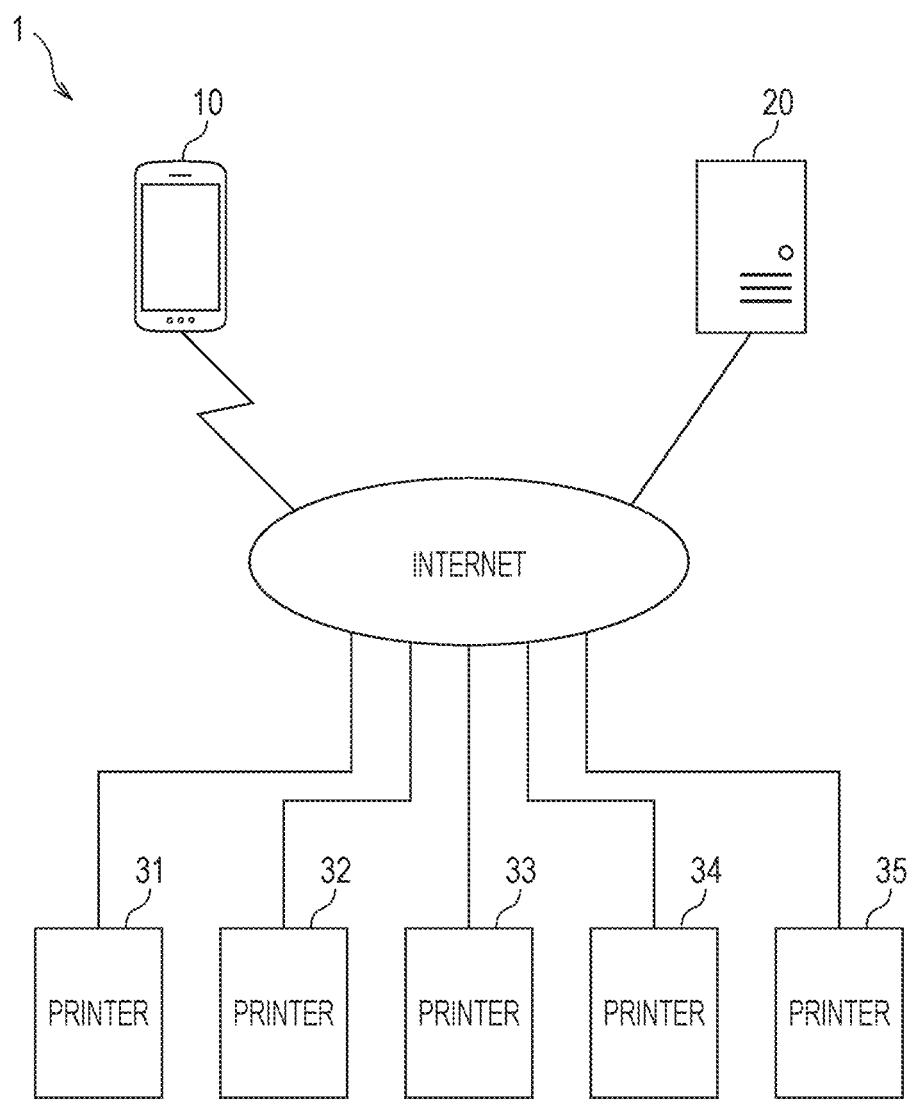
FIG. 1 is a general view illustrating a configuration of an image forming system including a server apparatus according to a first embodiment of the present disclosure.

As illustrated in FIG. 1, an image forming system 1 includes a terminal apparatus 10, a server apparatus 20, and one or more printers 31, 32, 33, 34, and 35. The terminal apparatus 10, the server apparatus 20, and each of the printers 31 to 35 are connected to an Internet communication line. In the present embodiment, the terminal apparatus 10 is connected to the Internet communication line wirelessly, and the server apparatus 20 and each of the printers 31 to 35 are connected to the Internet communication line through a wire. However, the terminal apparatus 10 may be connected through a wire, and the server apparatus 20 and part or all of the printers 31 to 35 may be connected wirelessly.

As specific examples of the terminal apparatus 10, a smartphone, a tablet terminal, a personal computer, and the like can be cited. As specific examples of the printers 31 to 35, a multi-function printer having a plurality of image forming modes, such as a printer mode, a copy mode, and a facsimile mode, as well as a single function printer can be cited. As image forming methods for the printers 31 to 35, an electrophotographic method, an inkjet method, a thermal method, or the like can be cited. There is no special limitation on the image forming methods and any type of method is acceptable as long as it is able to form an image on paper. As one example, the printers 31 to 35 are installed in a public space such as a convenience store or a bookstore. The printers 31 to 35 correspond to image forming apparatuses forming an image on paper.

Figure 2:
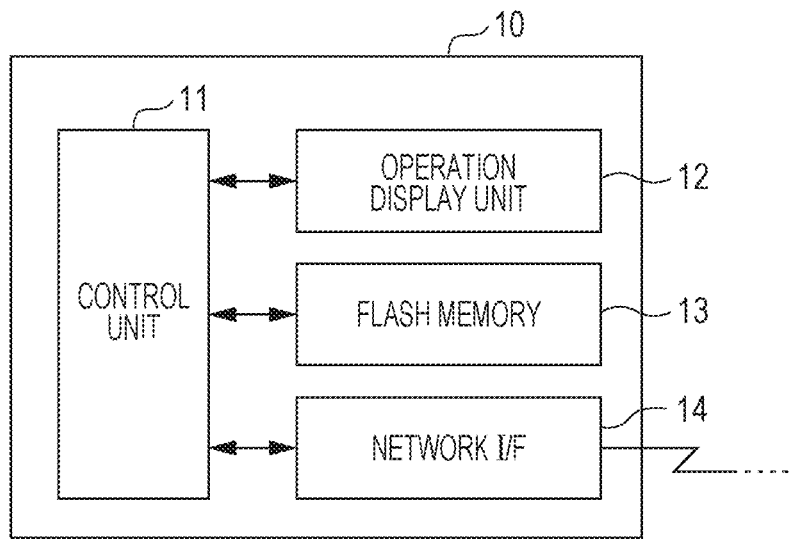
FIG. 2 is a block diagram illustrating a configuration of a terminal apparatus included in the image forming system.

As illustrated in FIG. 2, the terminal apparatus 10 includes a control unit 11, an operation display unit 12, a flash memory 13, and a network interface 14.

The operation display unit 12 performs reception and display of an input operation of various types of information. As an example, the operation display unit 12 is formed of a liquid crystal touch panel.

The flash memory 13 is a non-volatile memory and stores therein an image forming control program executed by the control unit 11, account information for logging in an SNS, and a piece of image data such as photograph data and stamp image data. The account information includes identification data (ID) and a password. It is to be noted that the flash memory 13 is an example of a device having a function of storing therein various types of information. Instead of the flash memory 13, other types of storage devices such as a hard disk may be used.

The network interface 14 includes at least either one of a wireless local area network (LAN) interface connecting the control unit 11 to the Internet via a wireless router which is not illustrated and a mobile communication interface connecting the control unit 11 to the Internet via a mobile base station. In the present embodiment, the network interface 14 includes both of the wireless LAN interface and the mobile communication interface. The network interface 14 performs transmission of the account information in the SNS, messages in the SNS, pieces of the image data, and the like to the server apparatus 20 as well as reception of messages from the server apparatus 20. The messages include texts, photographs, and icons referred to as stamps in the SNS. Hereinafter, these icons are also referred to as stamps.

A stamp is displayed to a user as a pictograph in a manner mixed with a text in a message in the SNS. A piece of stamp data includes a header code indicating a corresponding stamp, a stamp code assigned so as to indicate the stamp, and a piece of stamp image data. It is to be noted that a piece of text data is formed of a character code. When the stamp is transmitted to the server apparatus 20 from the terminal apparatus 10, the header code and the stamp code are transmitted.

When the message is displayed on the terminal apparatus 10, the control unit 11 reads out the codes of the message in accordance with a display program of the message and displays a piece of display data corresponding thereto. When the control unit 11 has read out the character code, the control unit 11 displays a character (font) corresponding to the character code in a display region of the message. When the control unit 11 has read out the header code indicating the stamp, the control unit 11 continuously reads out the stamp code to identify the stamp, calls the piece of stamp image data, and displays the called piece of stamp image data in the display region of the message as an image of the stamp. The stamp image data is locally stored in the terminal apparatus 10 in a specific file format (example: png format).

The control unit 11 performs overall control of the devices in the terminal apparatus 10. The control unit 11 executes the image forming control program, thereby receiving an image forming condition and an image forming instruction. More specifically, the control unit 11 reads out the account information from the flash memory 13 and transmits the read account information to the server apparatus 20, thereby logging in the SNS. The control unit 11 receives selection of the piece of image data as well as the image forming condition and the image forming instruction over the SNS and transmits the piece of image data and the like to any of the printers 31 to 35 via the server apparatus 20, thereby causing the image based on the piece of image data to be formed on paper. The details of this processing will be described later.

Figure 3:
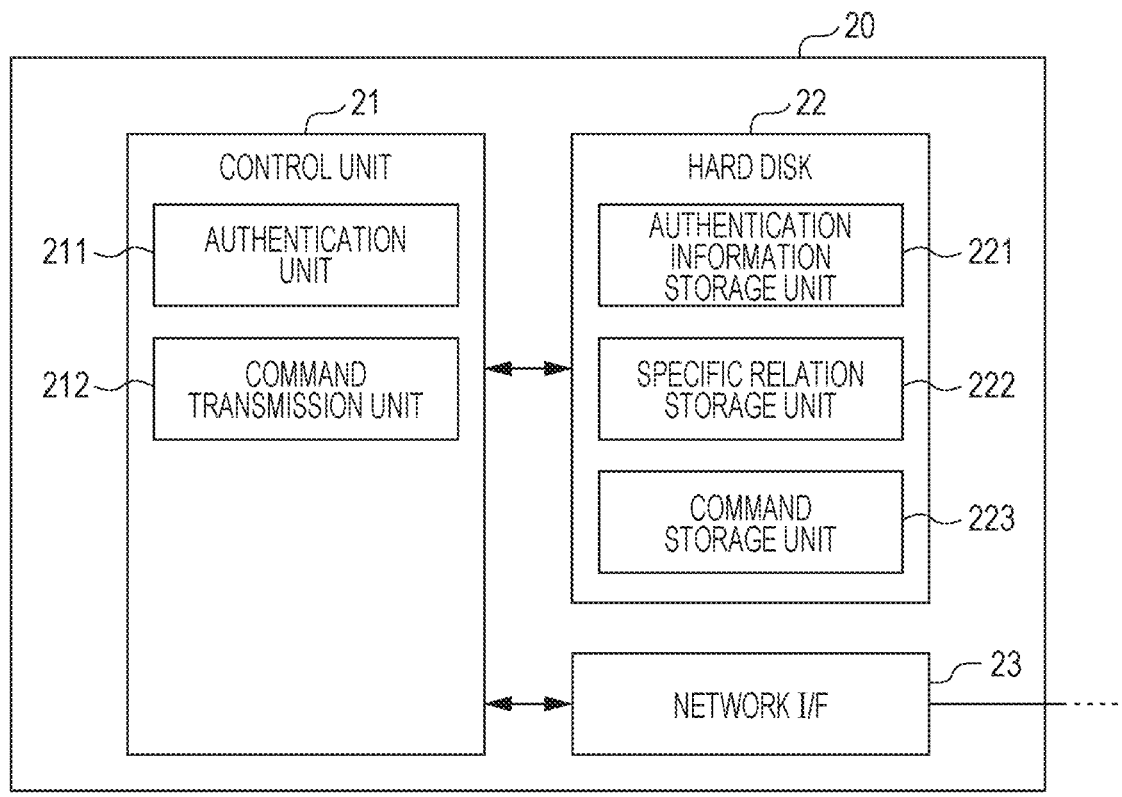
FIG. 3 is a block diagram illustrating a configuration of the server apparatus.

As illustrated in FIG. 3, the server apparatus 20 includes a control unit 21, a hard disk 22, and a network interface 23.

The network interface 23 connects the control unit 21 to the Internet and, over the SNS, performs transmission of messages to the terminal apparatus 10, transmission of commands and pieces of image data to the printers 31 to 35 as well as reception of messages and pieces of image data from the terminal apparatus 10, and reception of pieces of status information from the printers 31 to 35, for example.

The hard disk 22 includes an authentication information storage unit 221, a specific relation storage unit 222, and a command storage unit 223.

The authentication information storage unit 221 stores therein authentication information for authenticating the account information received from the terminal apparatus 10 and the printers 31 to 35.

The specific relation storage unit 222 stores therein specific relations between the terminal apparatus 10 and each of the printers 31 to 35, accounts of which are registered in the SNS and among which communication of messages using the SNS is allowed. In the SNS, communication of messages between the users whose accounts are registered is not allowed only with the registrations of accounts. When a specific relation registration has been made, the users registered in the specific relation are able to perform communication of messages with each other.

The command storage unit 223 stores therein relations between one or more icons and commands each corresponding to a respective one of the icons. Each command includes an image forming condition and an image forming instruction. Each of the icons corresponds to an image forming condition having a setting detail different from those of others, for example, A4 size paper or B5 size paper. Furthermore, it is desirable that a combination of a plurality of setting types among a paper size, an image forming mode, printing surfaces, a layout, a number of copies, and the like corresponds to each of the icons. It is to be noted that image formation and printing herein indicate the same meaning.

In addition to these, the hard disk 22 stores therein various types of information such as a software program executed by the control unit 21 to provide the SNS. It is to be noted that instead of the hard disk 22, other storage devices such as a flash memory may be used.

The control unit 21 includes an authentication unit 211 and a command transmission unit 212.

The authentication unit 211 collates the account information provided from the terminal apparatus 10 and the printers 31 to 35 with the authentication information stored in the authentication information storage unit 221 and performs authentication whether the account of each of the terminal apparatus 10 and the printers 31 to 35 is registered in the SNS. When the account is registered, the authentication unit 211 causes the registered one of the terminal apparatus 10 and the printers 31 to 35 to log in the SNS. When the account is not registered, the authentication unit 211 transmits log-in error information to the unregistered one of the terminal apparatus 10 and the printers 31 to 35.

When the server apparatus 20 has received, from the terminal apparatus 10, a selected icon that has been selected on the terminal apparatus 10 out of the icons usable over the SNS provided in the terminal apparatus 10, information indicating a selected printer (for example, the printer 31) that has been selected on the terminal apparatus 10 out of the printers 31 to 35 that are in specific relations with the terminal apparatus 10, and a piece of image data used for forming an image by the selected printer, the command transmission unit 212 reads out a corresponding command corresponding to the selected icon from the command storage unit 223 and transmits the corresponding command and the piece of image data to the selected printer. The details of this processing will be described later.

Figure 4:
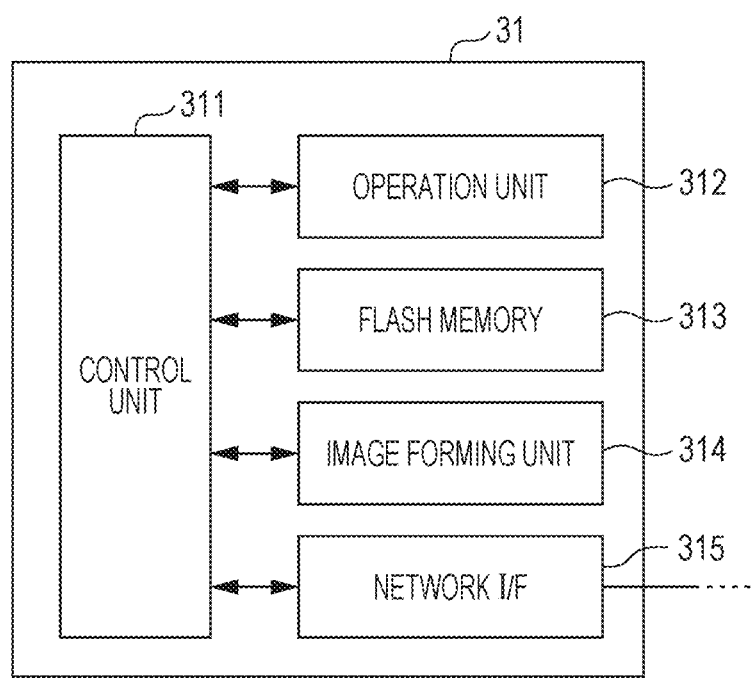
FIG. 4 is a block diagram illustrating a configuration of an image forming apparatus included in the image forming system.

As illustrated in FIG. 4, the printer 31 includes a control unit 311, an operation unit 312, a flash memory 313, an image forming unit 314, and a network interface 315.

The network interface 315 connects the control unit 311 to the Internet and receives commands and pieces of image data from the server apparatus 20. The network interface 315 further transmits, to the server apparatus 20, a piece of status information indicating a state of the printer 31 such as information on whether the printer 31 is in a state capable of forming an image and information that an image formation has been completed or an error has been generated.

The image forming unit 314 performs an image forming process with an electrophotographic method, thereby forming an image on paper. It is to be noted that the image forming unit 314 may perform image formation with an inkjet method or a thermal method.

The flash memory 313 is a non-volatile memory that stores therein the account information for logging in the SNS and the like. It is to be noted that the flash memory 313 is an example of a device having a function of storing various types of information. Instead of the flash memory 313, other types of storage devices may be used.

The operation unit 312 receives input operations of various types of information. It is to be noted that the operation unit 312 may receive and display input operations of various types of information, and for example, may be formed of a liquid crystal touch panel.

The control unit 311 performs overall control of the devices in the printer 31. The control unit 311 reads out the account information from the flash memory 313 and transmits the read account information to the server apparatus 20, thereby logging in the SNS. The control unit 311 causes the image forming unit 314 to form an image on paper based on a piece of image data received from the terminal apparatus 10 via the server apparatus 20, in a state logging in the SNS.

With reference to FIGS. 5 to 9B, procedures of image forming control using the SNS will be described.

When the user performs a touch operation on the terminal apparatus 10 and an SNS application software thus has been activated on the terminal apparatus 10, the terminal apparatus 10 transmits the account information to the server apparatus 20. The server apparatus 20 collates the account information received from the terminal apparatus 10 with the authentication information stored in the authentication information storage unit 221 and performs authentication whether the account of the terminal apparatus 10 is registered in the SNS. When the account is registered, the server apparatus 20 causes the terminal apparatus 10 to log in the SNS. When the account is not registered, the server apparatus 20 transmits the log-in error information to the terminal apparatus 10. It is assumed that the printers 31 to 35 also have logged in the SNS with the same procedure. Furthermore, in the present embodiment, it is assumed that the terminal apparatus 10 and each of the printers 31 to 35 are registered in the specific relation.

Figure 6A:
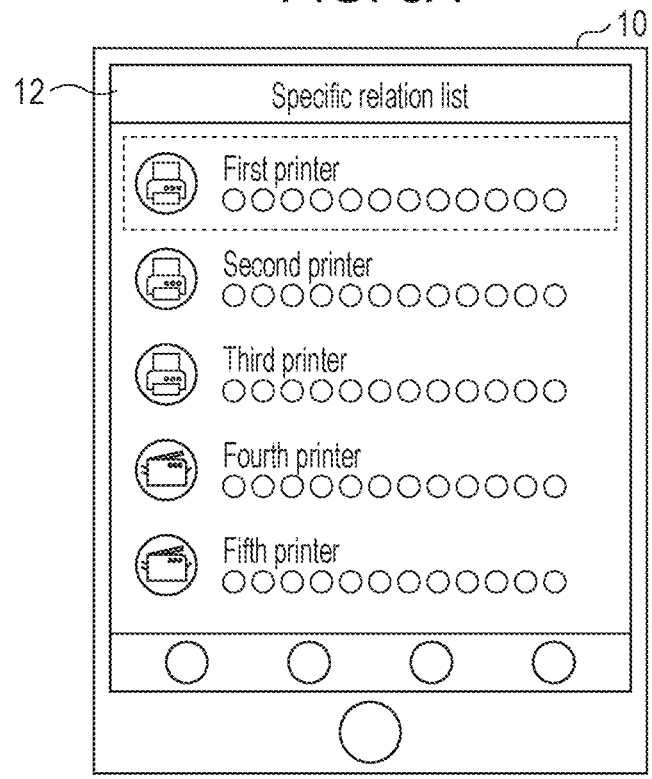
FIGS. 6A and 6B are examples of an operation display screen of the terminal apparatus, FIG. 6A illustrating a printer selection screen and FIG. 6B illustrating a talk screen with a selected printer.

As illustrated in FIG. 6A, the terminal apparatus 10 displays a list of account names of the printers 31 to 35 that are in specific relations with the terminal apparatus 10 on a screen of a specific relation list for the SNS to be displayed on the operation display unit 12 and receives selection of an optional printer from the printers 31 to 35. In FIG. 6A, the printers 31 to 35 are respectively described as a first printer, a second printer, a third printer, a fourth printer, and a fifth printer. However, in an actual case, it is desirable that account names that are easily identifiable such as model numbers or the like of the printers 31 to 35 are displayed. Under each of the account names of the printers 31 to 35, for example, information such as a guide text "Send stamp if you wish to print" is displayed.

In the terminal apparatus 10, out of the printers 31 to 35 that are registered in the specific relation, when a desired printer (for example, the printer 31) has been selected by the user (S1), the control unit 11 causes display of the operation display unit 12 to change to a talk screen for exchanging messages with the selected printer 31 (S2).

Figure 6B:
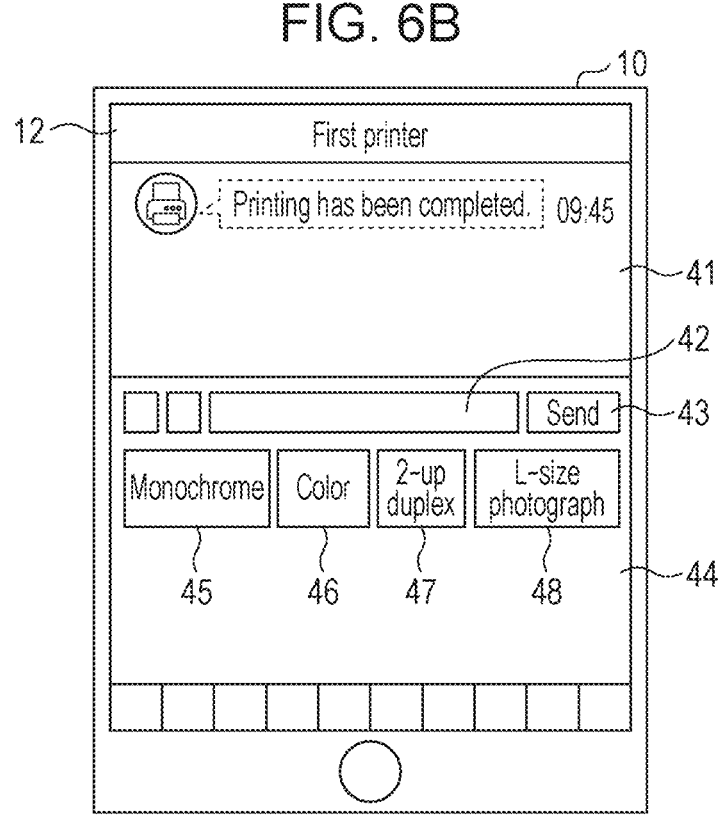

As illustrated in FIG. 6B, the talk screen with the printer 31 includes a message display region 41, a message input region 42, a Send button 43, and a stamp display region 44. As an example, the message display region 41 occupies approximately half of the upper side of the talk screen. The message input region 42 is arranged substantially in the center in the vertical direction of the talk screen. The Send button 43 is arranged so as to be adjacent to the right side of the message input region 42 and receives a transmission instruction of an input message. The stamp display region 44 occupies substantially half of the lower side of the talk screen.

In the message display region 41, histories of messages and times at which the messages are transmitted and received are displayed. As an example, the latest message is displayed in the lowest part of the message display region 41 and the histories of the messages are scrolled from bottom to top.

In the stamp display region 44, one or more icons referred to as stamps are displayed. In the present embodiment, four stamps 45, 46, 47, and 48 are displayed. As an example, the stamp 45 corresponds to image formation in a monochrome image forming mode. The stamp 46 corresponds to image formation in color image forming mode. The stamp 47 corresponds to image formation under an image forming condition related to a combination of two setting types of a layout printing forming two images in one sheet of paper and duplex printing. The stamp 48 corresponds to image formation under an image forming condition related to a combination of two setting types of using L-size paper and a purpose of photograph printing.

In the talk screen with the printer 31 illustrated in FIG. 6B, the terminal apparatus 10 receives selection of an optional stamp from the stamps 45 to 48. When an optional stamp has been selected by the user from the stamps 45 to 48 (for example, the stamp 48) and a touch operation has been performed on the Send button 43 (S3), the terminal apparatus 10 transmits information indicating the selected printer 31 and the selected stamp 48 to the server apparatus 20 (S4).

Figure 7A:
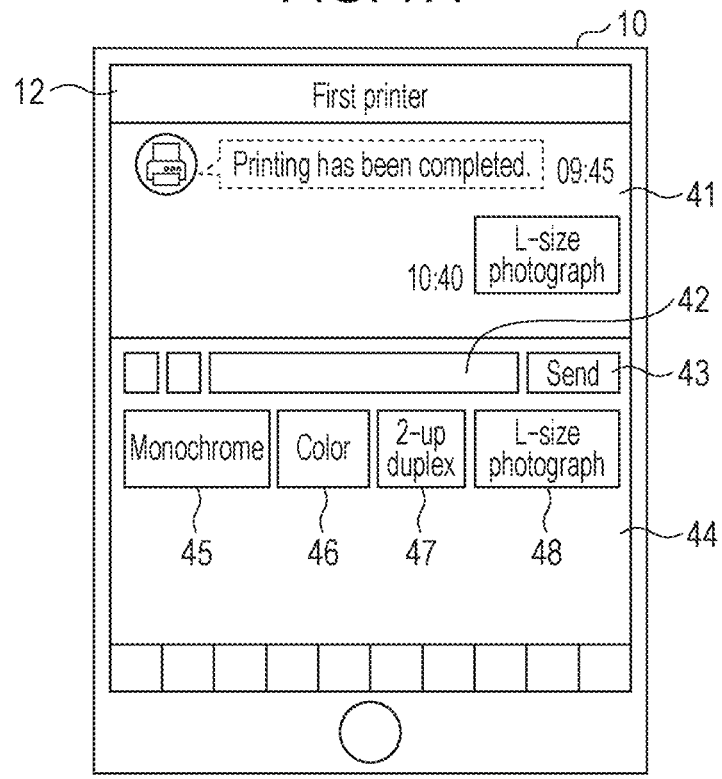
FIGS. 7A and 7B are other examples of the operation display screen of the terminal apparatus, FIG. 7A illustrating the screen in a state in which a stamp has been transmitted and FIG. 7B illustrating the screen in a state in which a reply message from the printer is displayed.

As illustrated in FIG. 7A, when the terminal apparatus 10 has transmitted the stamp 48, the terminal apparatus 10 displays a transmission history of the stamp 48 to the message display region 41.

When the server apparatus 20 has received the stamp 48 from the terminal apparatus 10, the server apparatus 20 causes a piece of stamp data of the stamp 48 to be temporarily saved in the hard disk 22 and makes an inquiry to the selected printer 31 about whether image formation is allowed (S5).

The printer 31 determines whether image formation is allowed (S6) and transmits a piece of status information indicating a result of the determination to the server apparatus 20 (S7).

When the server apparatus 20 has received, from the printer 31, a piece of status information indicating that image formation is allowed, the server apparatus 20 transmits, to the terminal apparatus 10, a reply message prompting transmission of the piece of image data (S8). When the server apparatus 20 has received, from the printer 31, a piece of status information indicating that image formation is not allowed, the server apparatus 20 transmits, to the terminal apparatus 10, a reply message indicating that image formation is not allowed. A case where the server apparatus 20 has received, from the printer 31, a piece of status information indicating that image formation is allowed will be described below.

Figure 7B:
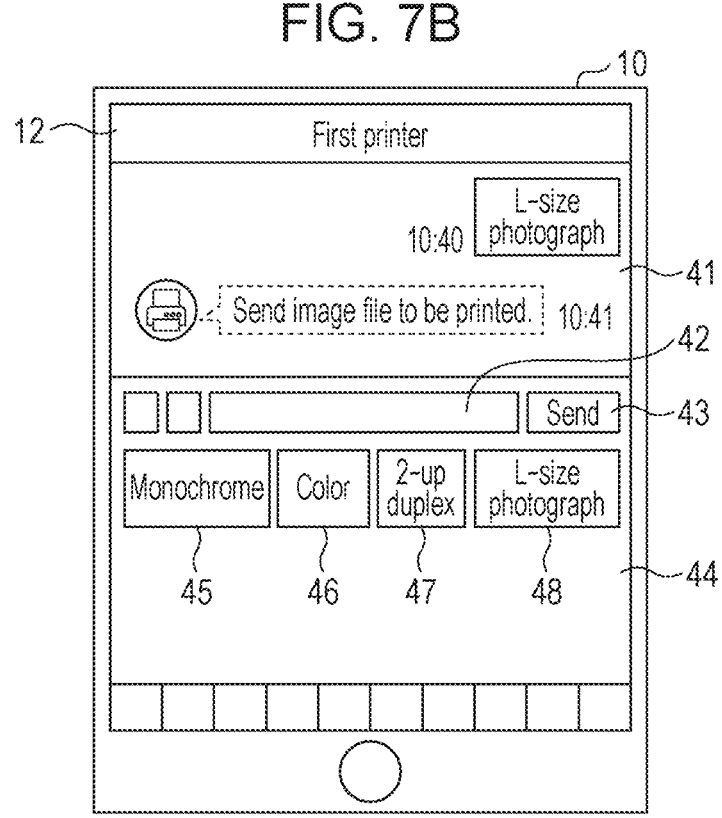

As illustrated in FIG. 7B, the terminal apparatus 10 displays the message prompting transmission of the piece of image data on the message display region 41 based on the reply message received from the server apparatus 20. For example, the terminal apparatus 10 displays a message "Send image file to be printed".

Figure 8A:
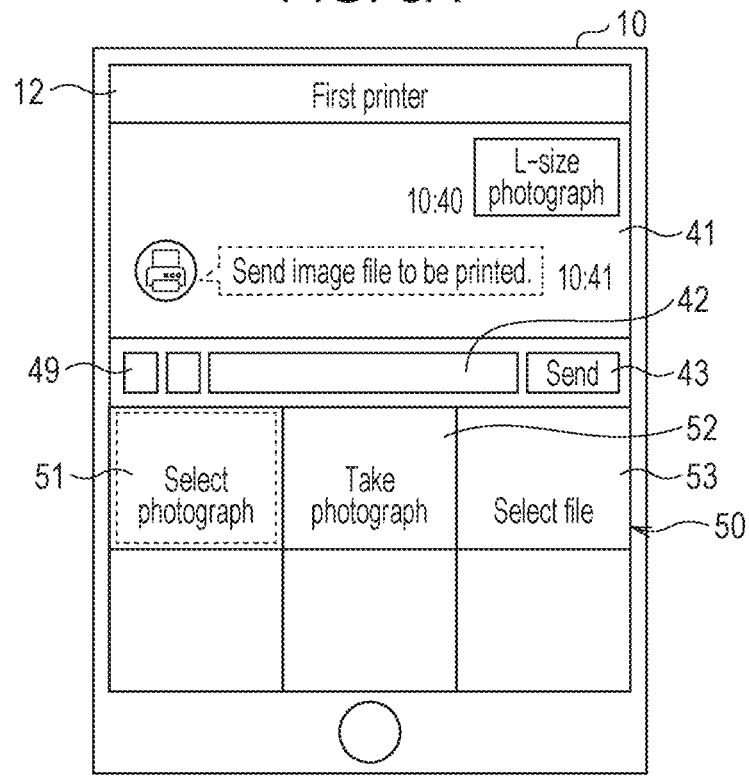
FIGS. 8A and 8B are still other examples of the operation display screen of the terminal apparatus, FIG. 8A illustrating a selection menu screen for a photograph or a file desired for image formation and FIG. 8B illustrating the screen in a state in which a photograph has been transmitted.

As illustrated in FIG. 8A, the talk screen with the printer 31 on the terminal apparatus 10 further includes a file management button 49 on the left side of the message input region 42. When a touch operation has been performed on the file management button 49, the terminal apparatus 10 causes the region that has been the stamp display region 44 to change to a file management region 50. As an example, in the file management region 50, a plurality of buttons including a button 51 for selecting a photograph, a button 52 for taking a photograph, and a button 53 for selecting an image file other than a photograph are displayed.

Figure 8B:
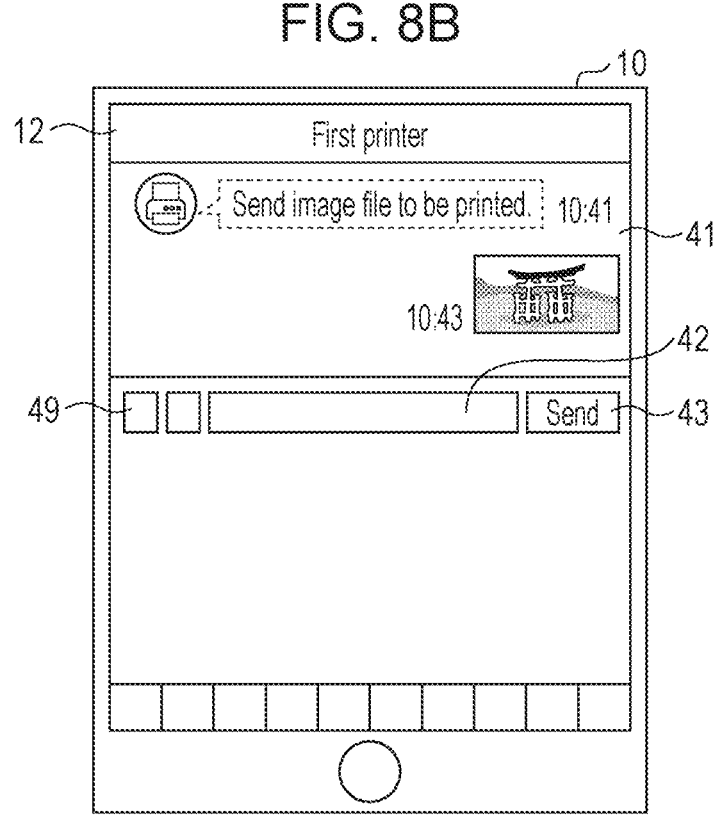

For example, when a touch operation has been performed on the button 51 for selecting a photograph, a desired photograph has been selected, and a touch operation has been performed on the Send button 43 (S9), the piece of image data of the selected photograph is transmitted to the server apparatus 20 (S10) and the photograph is displayed together with the transmission time in the message display region 41, as illustrated in FIG. 8B.

The server apparatus 20 reads out the piece of stamp data for the stamp 48 received at S4 from the hard disk 22 and reads out a command corresponding to the stamp 48 from the command storage unit 223, thereby converting the stamp 48 into the command (S11), and transmits the command and the piece of image data to the selected printer 31 (S12).

The printer 31 sets an image forming condition included in the received command before performing image formation based on the piece of image data (S13).

Figure 9A:
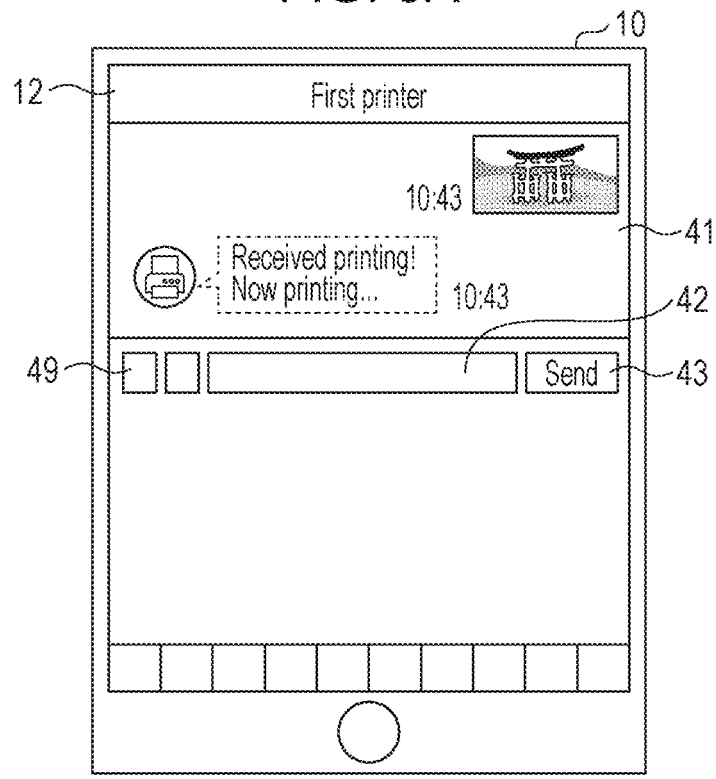
FIGS. 9A and 9B are yet other examples of the operation display screen of the terminal apparatus, FIG. 9A illustrating the screen in a state in which a reply message indicating that the printer has received an image forming instruction is displayed and FIG. 9B illustrating the screen in a state in which a message indicating that image formation has been completed is displayed.

When the printer 31 has started image formation, the printer 31 transmits, to the server apparatus 20, a piece of status information for causing a reply message "Received printing! Now printing . . . ", for example, to be displayed, as illustrated in FIG. 9A. Furthermore, when image formation has been completed, the printer 31 transmits a piece of status information indicating that image formation has been completed to the server apparatus 20 (S14). On the other hand, when an error has been generated, the printer 31 transmits a piece of status information indicating that effect to the server apparatus 20.

The server apparatus 20 transmits, to the terminal apparatus 10, a reply message based on the piece of status information received from the printer 31 (S15).

Figure 9B:
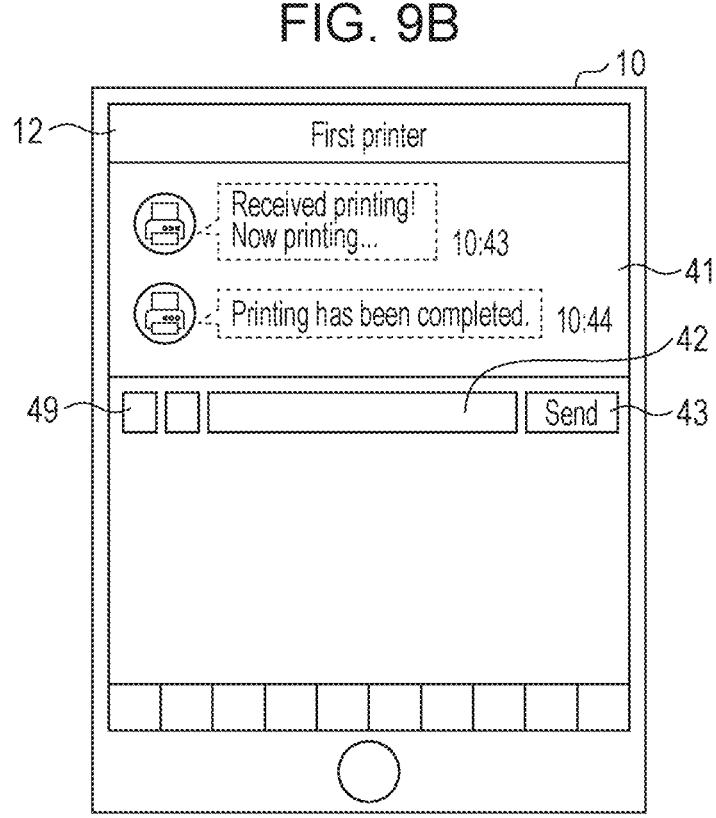

As illustrated in FIG. 9B, the terminal apparatus 10 displays the received reply message on the message display region 41 (S16).

As described above, according to the image forming control program executed in the terminal apparatus 10 or the server apparatus 20, from the terminal apparatus 10 to the server apparatus 20, the stamp 48 corresponding to the desired image forming condition is transmitted together with the information indicating the printer 31 desired to perform image formation and the piece of image data desired to be used for forming an image. With this, the command corresponding to this stamp 48 is transmitted to the selected printer 31. This causes the selected printer 31 to form an image based on the piece of image data on paper under the image forming condition corresponding to the selected stamp 48.

As described above, with a simple operation of transmitting the stamp 48, the image forming condition is set. With this, no printer driver has to be used, and various image forming conditions do not have to be set one by one.

Furthermore, by causing each of the stamps 45 to 48 to correspond to an image forming condition having a setting detail different from those of others, for example, a monochrome image forming mode or a color image forming mode, an image forming condition is able to be set by selecting a desired setting detail from setting details different from one another. Furthermore, when a combination of a plurality of setting types among a paper size, an image forming mode, printing surfaces, a layout, a number of copies, and the like is set to correspond to each of the stamps 45 to 48, transmission of one stamp enables to set an image forming condition related to the combination of a plurality of setting types. This enables to improve operability of setting of an image forming condition.

Second Embodiment

Figure 10:
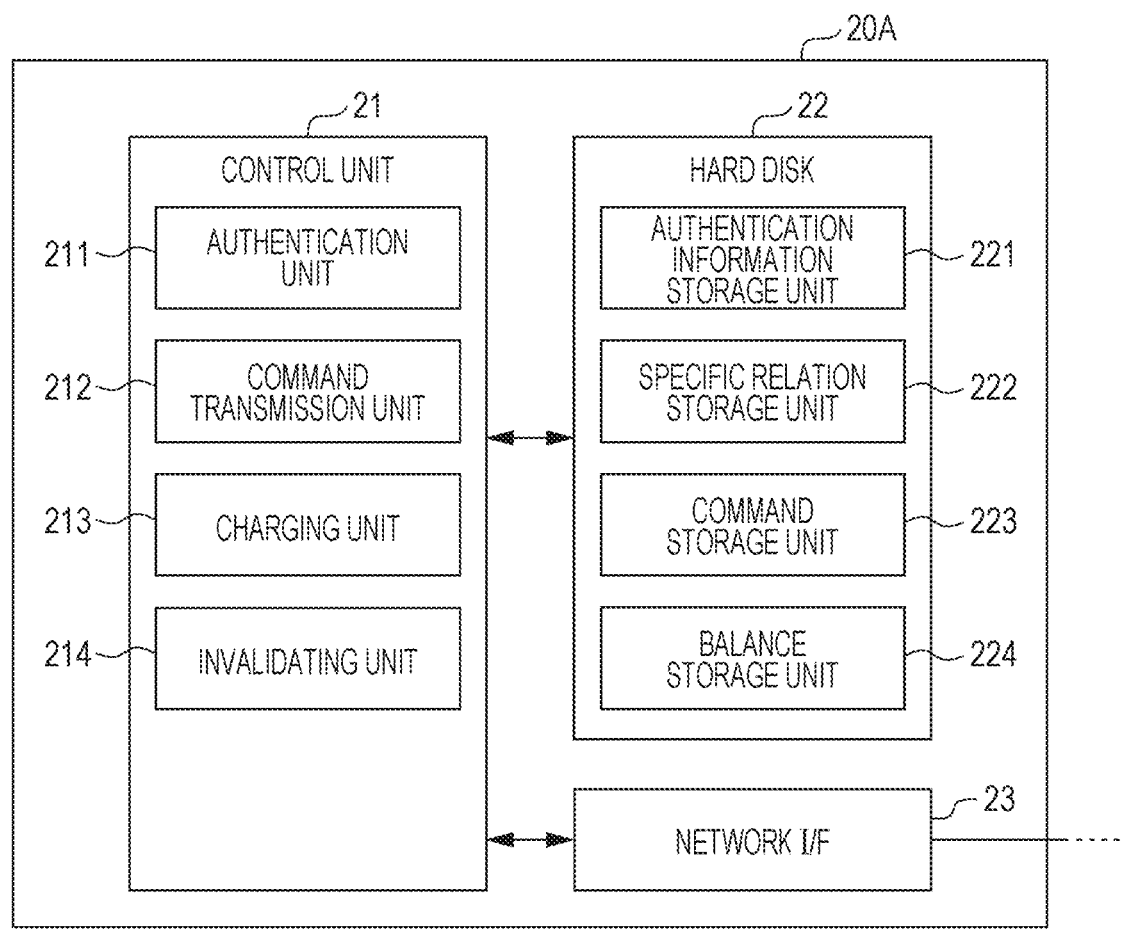
FIG. 10 is a block diagram illustrating a configuration of a server apparatus according to a second embodiment.

As illustrated in FIG. 10, a server apparatus 20A according to a second embodiment is characterized by a configuration in which the control unit 21 further includes a charging unit 213 and an invalidating unit 214 and the hard disk 22 further includes a balance storage unit 224. The other part of the configuration is formed in the same manner as in the server apparatus 20 according to the first embodiment.

The charging unit 213 provides the stamps 45 to 48 whose correspondence relations with commands are stored in the command storage unit 223 to the terminal apparatus 10 in exchange for charging at preset prices.

The balance storage unit 224 stores therein an initial balance preset for each of the stamps 45 to 48 provided by the charging unit 213. With respect to each of the stamps 45 to 48, the balance storage unit 224 stores therein a current balance obtained by subtracting an integrated value of generated charges from the initial balance. The charge is generated with the server apparatus 20A receiving each of the stamps 45 to 48 from the terminal apparatus 10 and transmitting a command corresponding to that stamp to any of the printers 31 to 35, that is, forming an image on paper.

The invalidating unit 214 invalidates a noted stamp out of the stamps 45 to 48 in the terminal apparatus 10 when the current balance of the noted stamp becomes less than a price of a charge generated by transmitting a command corresponding to the noted stamp to any of the printers 31 to 35.

Figure 11:
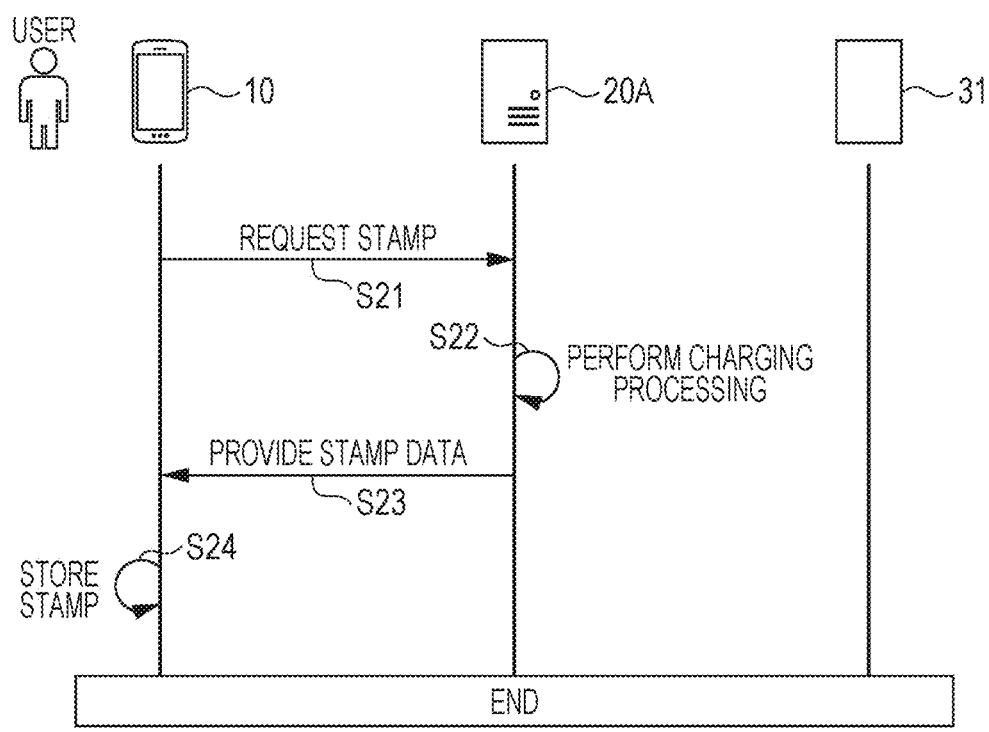
FIG. 11 is a sequence diagram explaining part of processing according to the second embodiment.

As illustrated in FIG. 11, when the user has performed a touch operation on the terminal apparatus 10 and thereby transmits a request to purchase an optional stamp out of the stamps 45 to 48 to the server apparatus 20A from the terminal apparatus 10 (S21), the server apparatus 20A performs charging processing at a preset price (S22) and provides a piece of stamp data of the requested stamp out of the stamps 45 to 48 to the terminal apparatus 10 (S23). The terminal apparatus 10 stores the piece of stamp data in the flash memory 13 (S24) and displays the stamps 45 to 48 as appropriate on the operation display unit 12. When the server apparatus 20A provides the stamps to the terminal apparatus 10, the server apparatus 20A transmits, to the terminal apparatus 10, a stamp code and a piece of stamp image data that correspond to the stamp to be provided. The stamp code is used for associating the stamp and the command.

Figure 5:
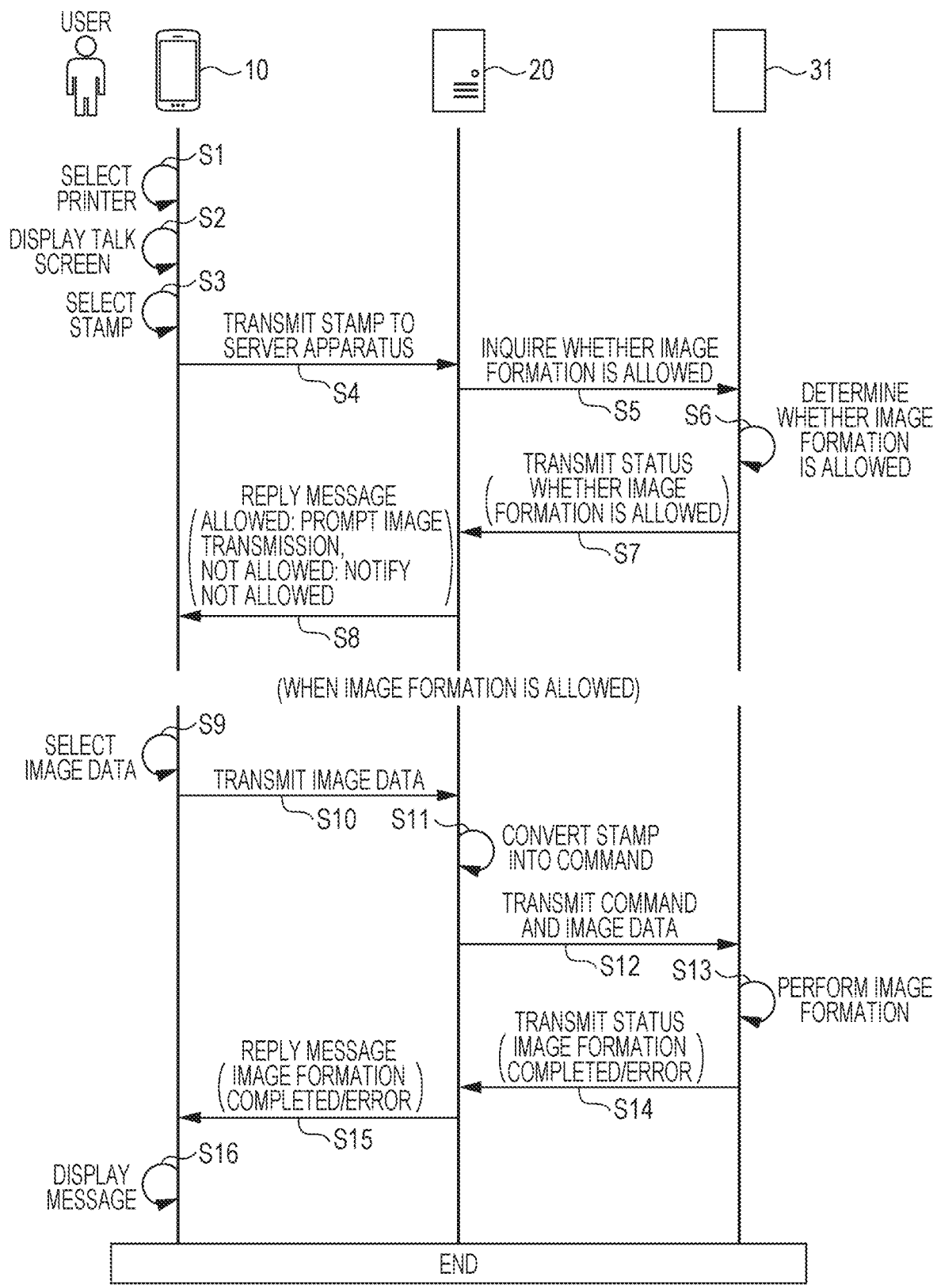
FIG. 5 is a sequence diagram explaining a series of processing according to the first embodiment.

When procedures as illustrated in FIG. 5 have been performed by using any of the stamps 45 to 48 that has been provided to the terminal apparatus 10 with charging processing, an image is formed on paper and a message indicating that image formation has been completed is displayed on the terminal apparatus 10.

Figure 12:
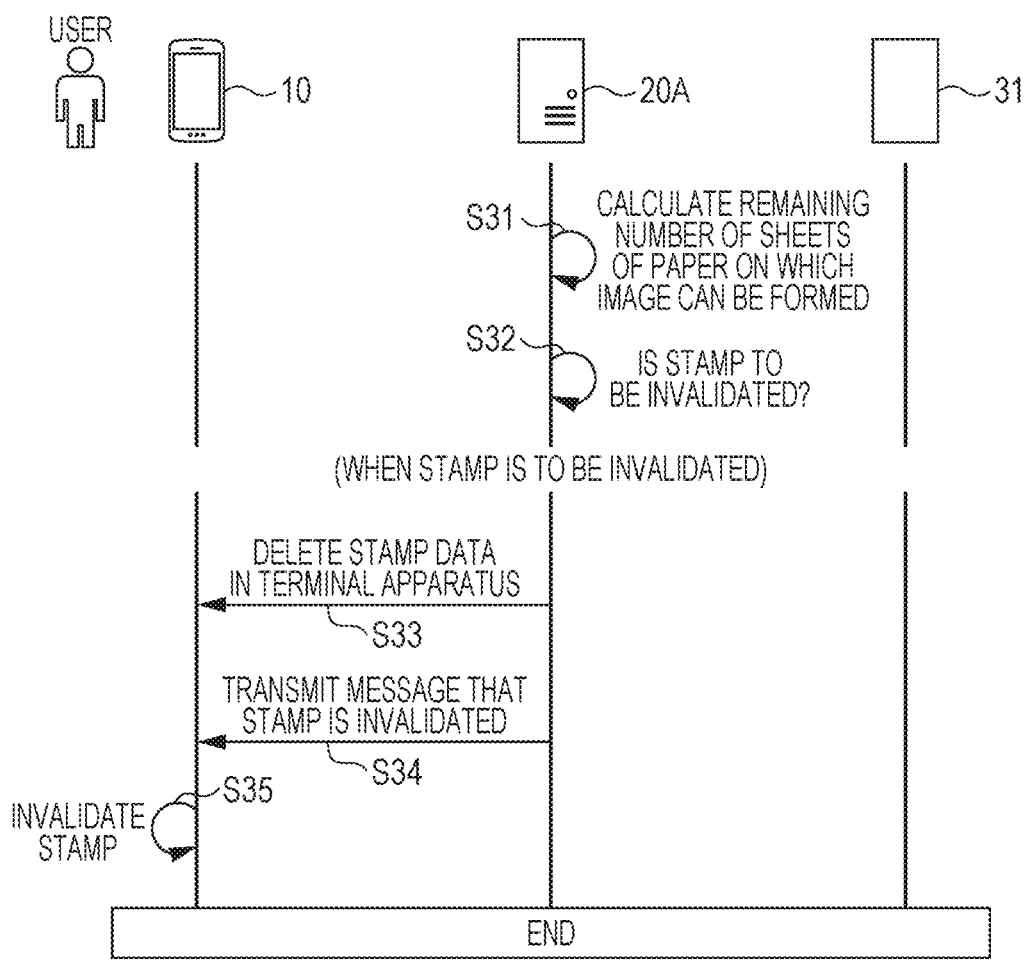
FIG. 12 is a sequence diagram explaining part of processing according to the second embodiment.

As illustrated in FIG. 12, the server apparatus 20A calculates a remaining number of sheets of paper on which an image can be formed for the noted stamp out of the stamps 45 to 48, by dividing the current balance of the noted stamp by the price of a charge generated by forming an image by transmitting the command corresponding to the noted stamp to any of the printers 31 to 35 (S31). In the same manner, the server apparatus 20A calculates a remaining number of sheets of paper on which an image can be formed for each of the stamps 45 to 48.

The server apparatus 20A determines whether the current balance of the noted stamp has become less than the price of the charge generated by forming an image by transmitting the command corresponding to the noted stamp to any of the printers 31 to 35, that is, whether the remaining number of sheets of paper on which an image can be formed has become 0, as a result of the calculation at S31. When the remaining number of sheets of paper on which an image can be formed has become 0, the server apparatus 20A determines that the noted stamp is to be invalidated (S32).

It is to be noted that steps described below may be employed in the configuration. To each of the stamps 45 to 48, an initial number of sheets of paper on which an image can be formed is set, and the set number is stored in the hard disk 22. At S31, the invalidating unit 214 calculates a remaining number of sheets of paper on which an image can be formed for the noted stamp by subtracting an integrated value of numbers of sheets of paper on which images have been formed by transmitting commands corresponding to the noted stamp to the printers 31 to 35 from the initial number of sheets for the noted stamp. The calculated remaining number of sheets of paper on which an image can be formed is stored in the hard disk 22. At S32, when the remaining number of sheets of paper on which an image can be formed has become 0, the invalidating unit 214 determines that the noted stamp is to be invalidated.

When the stamp is to be invalidated, the server apparatus 20A transmits, to the terminal apparatus 10, a piece of instruction data instructing to delete the piece of stamp data on the terminal apparatus 10 (S33). Furthermore, the server apparatus 20A transmits, to the terminal apparatus 10, a message that the stamp has been invalidated (S34).

The terminal apparatus 10 invalidates the stamp for which the piece of instruction data instructing to delete has been received from the server apparatus 20A (S35). Specifically, for example, the terminal apparatus 10 deletes the stamp. It is to be noted that when the piece of instruction data instructing to delete has been received from the server apparatus 20A, the stamp may be displayed in a grayed-out manner so as to receive no more touch operation and may be deleted by the user performing a deletion operation.

With the server apparatus 20A, the stamps 45 to 48 are purchased from the server apparatus 20A, whereby these stamps 45 to 48 are provided to the terminal apparatus 10. A printer out of the printers 31 to 35 and a piece of image data are selected and any of the stamps 45 to 48 is transmitted to the server apparatus 20A, whereby a command corresponding to the selected one out of the stamps 45 to 48 is transmitted to the selected one of the printers 31 to 35. With this, image formation is performed and at the same time, settlement of a charge generated by the image formation is performed. That is to say, at the point where the stamps 45 to 48 have been purchased, settlement of charges for image formation has been completed for a predetermined number of sheets. With this, when actual image formation is performed, additional payment of a charge does not have to be made.

Furthermore, when the current balance of the noted stamp is insufficient for the price of the charge for image formation to be performed by transmitting the noted stamp, the noted stamp is invalidated in the terminal apparatus 10. With this, image formation is performed within a range of the initial balance preset at the time when the stamps 45 to 48 have been purchased, whereby a charge exceeding the initial balance is inhibited from being generated.

Third Embodiment

Figure 13:
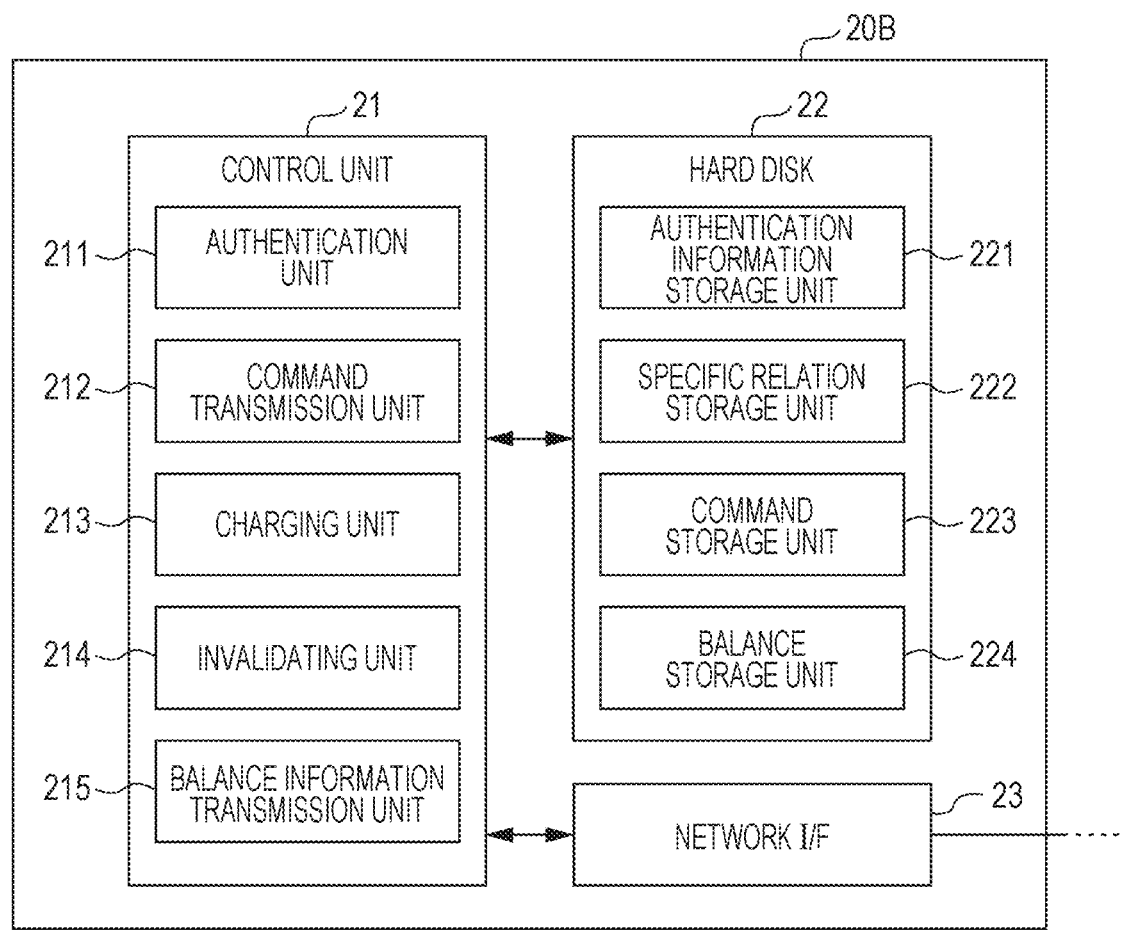
FIG. 13 is a block diagram illustrating a configuration of a server apparatus according to a third embodiment.

As illustrated in FIG. 13, a server apparatus 20B according to a third embodiment is characterized by a configuration in which the control unit 21 further includes a balance information transmission unit 215. The other part of the configuration is formed in the same manner as in the server apparatus 20A according to the second embodiment.

With respect to each of the stamps 45 to 48, the balance information transmission unit 215 reads out the current balance from the balance storage unit 224 and transmits information related to the current balance to the terminal apparatus 10.

Figure 14:
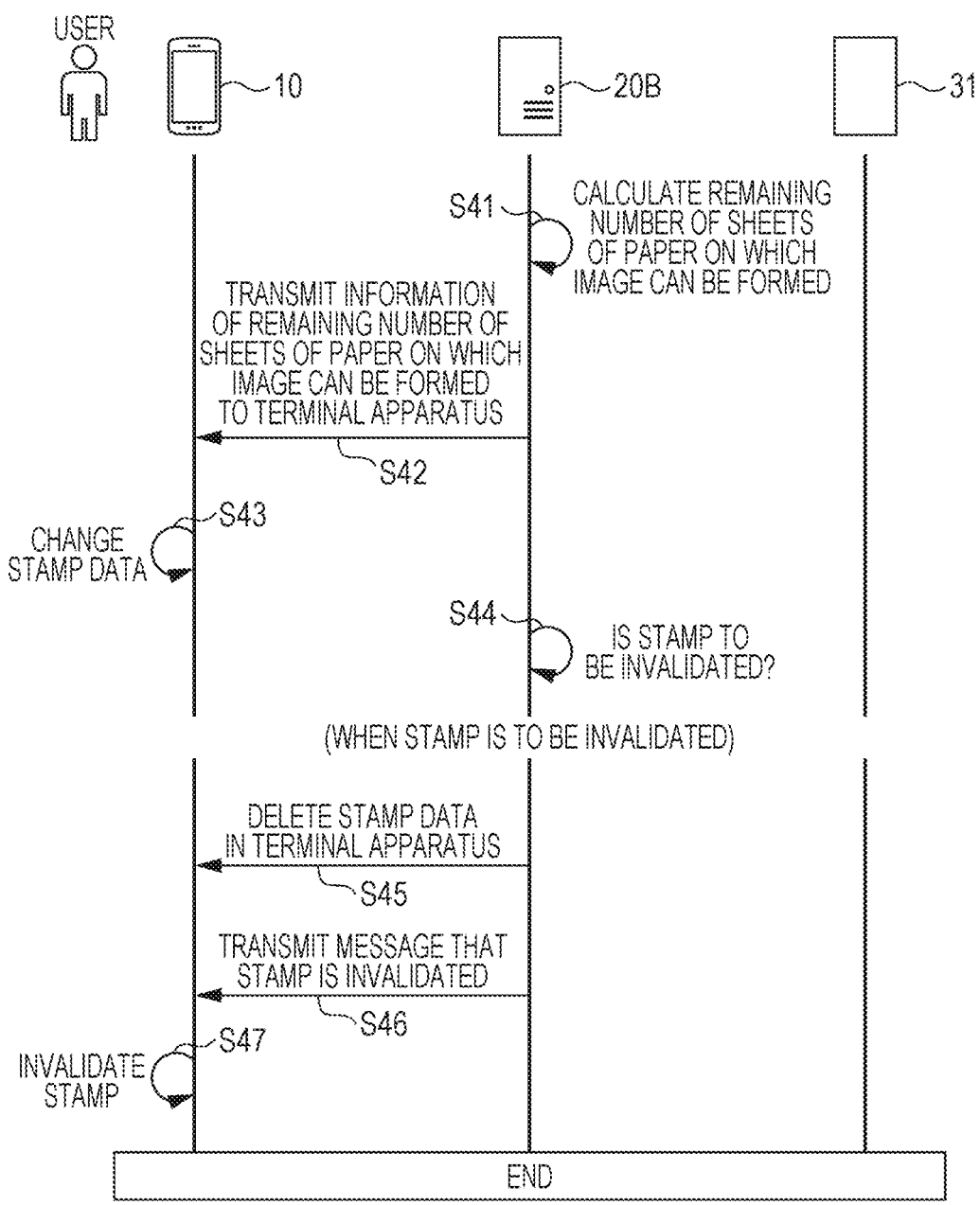
FIG. 14 is a sequence diagram explaining part of processing according to the third embodiment.

As illustrated in FIG. 14, in the same manner as in S31, the server apparatus 20B calculates a remaining number of sheets of paper on which an image can be formed for each of the stamps 45 to 48 (S41). The server apparatus 20B transmits, to the terminal apparatus 10, a piece of information of the remaining number of sheets of paper on which an image can be formed for each of the stamps 45 to 48 that has been acquired at S41 (S42). The terminal apparatus 10 updates the piece of stamp data of each of the stamps 45 to 48 based on the piece of information received from the server apparatus 20B (S43). As illustrated in FIG. 6A, the terminal apparatus 10 displays the remaining number of sheets of paper on which an image can be formed under each of the account names of the printers 31 to 35, based on the piece of stamp data. It is to be noted that under each of the account names of the printers 31 to 35, based on the piece of stamp data, the current balance may be displayed. Furthermore, together with the current balance, the price for image formation may be displayed.

In the same manner as in S32, the server apparatus 20B determines whether the remaining number of sheets of paper on which an image can be formed has become 0. When the remaining number of sheets of paper on which an image can be formed has become 0, the server apparatus 20B determines that the stamp is to be invalidated (S44).

When stamp is to be invalidated, in the same manner as in S33, the server apparatus 20B transmits, to the terminal apparatus 10, a piece of instruction data instructing to delete the piece of stamp data on the terminal apparatus 10 (S45). Furthermore, in the same manner as in S34, the server apparatus 20B transmits, to the terminal apparatus 10, a message that the stamp has been invalidated (S46).

In the same manner as in S35, the terminal apparatus 10 invalidates the stamp for which the piece of instruction data instructing to delete has been received from the server apparatus 20B (S47).

The server apparatus 20B enables the user to easily recognize the remaining number of sheets of paper on which an image can be formed or the current balance for each of the stamps 45 to 48 on the terminal apparatus 10.

Fourth Embodiment

Figure 15:
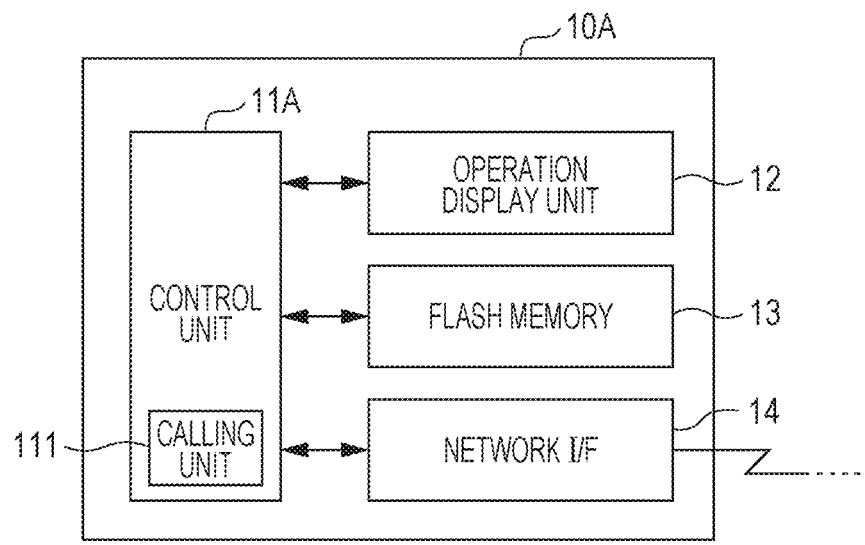
FIG. 15 is a block diagram illustrating a configuration of a terminal apparatus according to a fourth embodiment.

As illustrated in FIG. 15, a terminal apparatus 10A according to a fourth embodiment is characterized by a configuration in which a control unit 11A includes a calling unit 111. The other part of the configuration is formed in the same manner as in the terminal apparatus 10 according to the first embodiment.

In the present embodiment, a piece of stamp data includes a piece of text data for calling. That is to say, a piece of stamp data includes a header code, a stamp code, a piece of stamp image data, and a piece of text data for calling.

When a text for calling has been input during editing of a message in the SNS application software, the calling unit 111 calls a stamp associated with this text as a conversion candidate and displays the called stamp on the operation display unit 12. This enables the user to easily call a desired stamp during editing of a message in the SNS application software.

For example, with a stamp indicating a laugh, a text for calling "laugh" is associated. With a stamp indicating printing, a text for calling "print" is associated.

It is to be noted that the characteristics of the present embodiment can be applied to the configurations in the second embodiment and the third embodiment.

Fifth Embodiment

Figure 16:
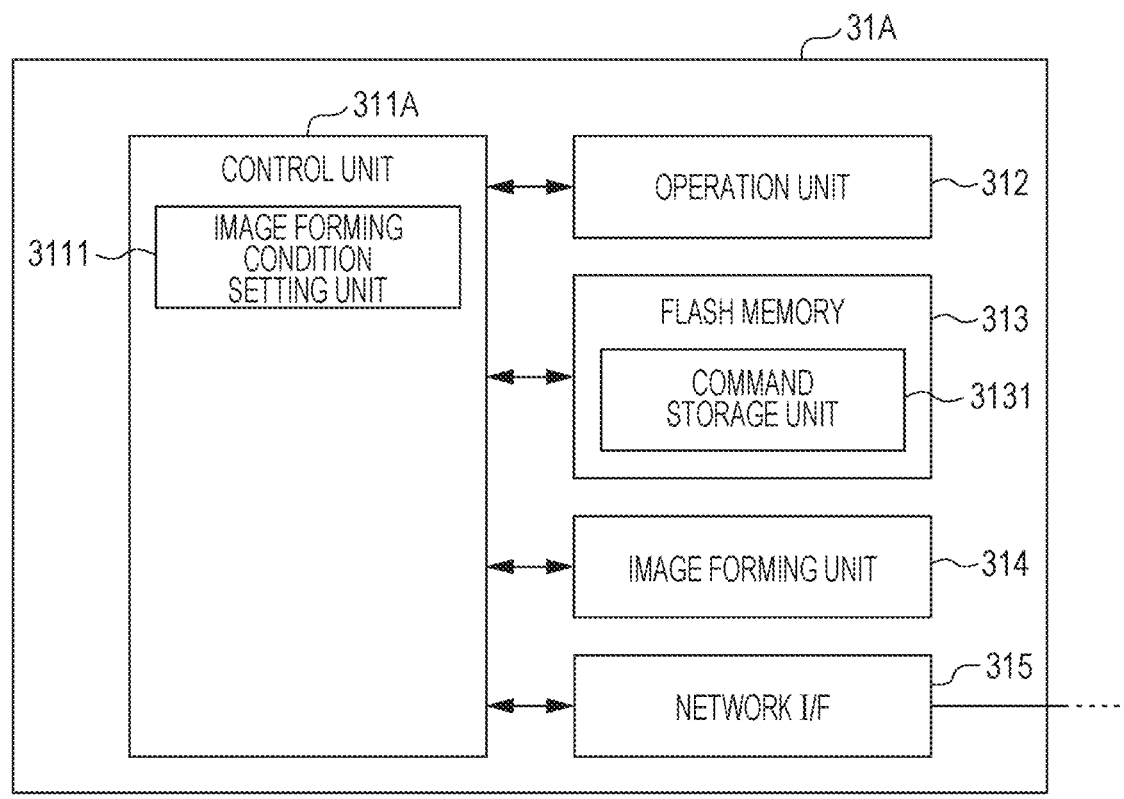
FIG. 16 is a block diagram illustrating a configuration of a printer according to a fifth embodiment.

As illustrated in FIG. 16, the printer 31A according to a fifth embodiment is characterized by a configuration in which a control unit 311A includes an image forming condition setting unit 3111 and the flash memory 313 includes a command storage unit 3131. The other part of the configuration is formed in the same manner as in the printer 31.

The command storage unit 3131 stores therein relations between one or more icons (for example, the stamps 45 to 48) and commands each corresponding to a respective one of the icons. As described above, each of the commands includes an image forming condition and an image forming instruction.

When the image forming condition setting unit 3111 has received any of the icons and a piece of image data from the server apparatus 20, the image forming condition setting unit 3111 reads out a corresponding command corresponding to the received icon from the command storage unit 3131 and causes the image forming unit 314 to form an image based on the piece of image data under the image forming condition included in the corresponding command.

Figure 17:
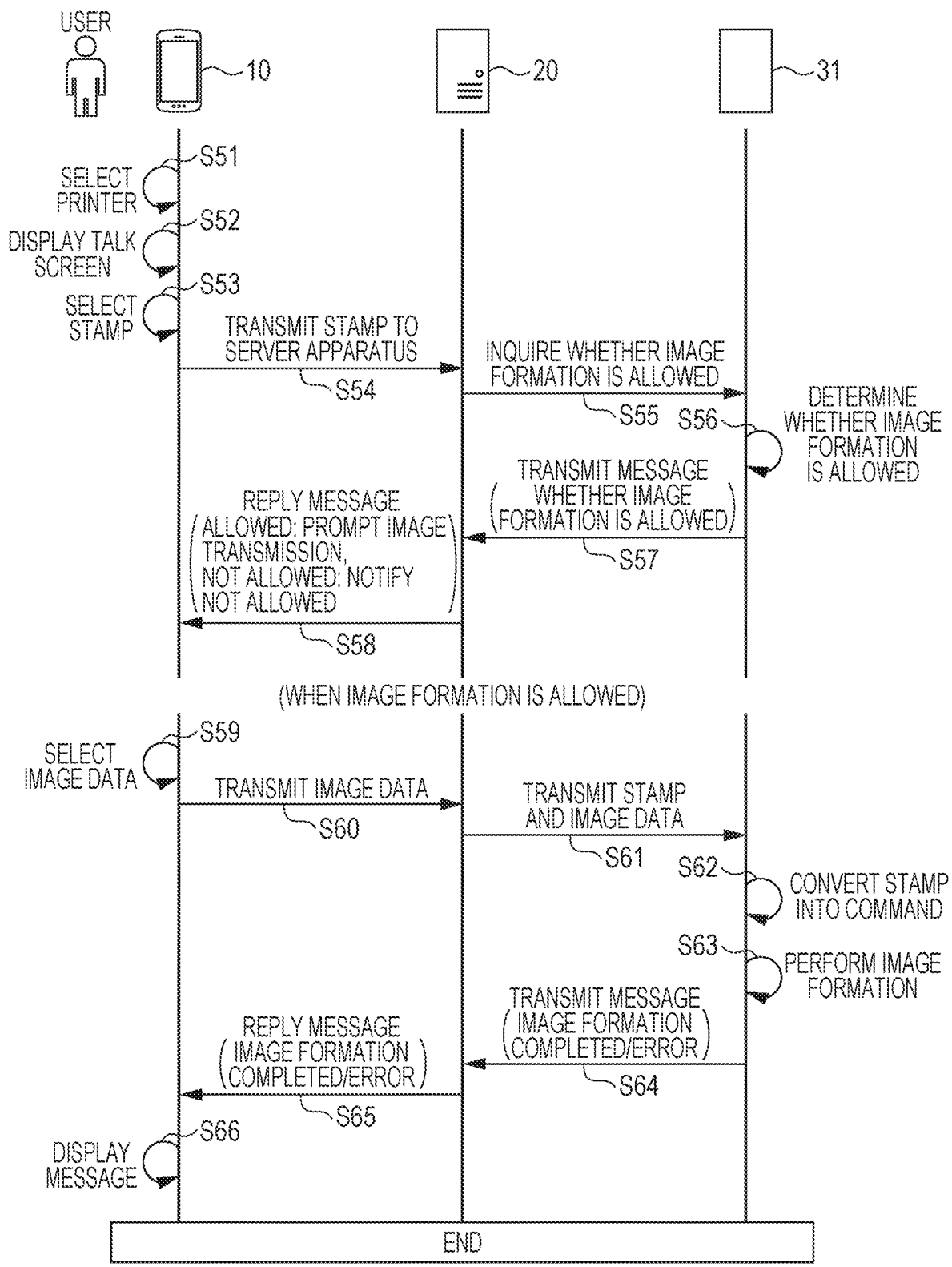
FIG. 17 is a sequence diagram explaining processing according to the fifth embodiment.

As illustrated in FIG. 17, the procedures at S51 to S60 are performed in the same manner as the procedures in S1 to S10 illustrated in FIG. 5.

In the present embodiment, the server apparatus 20 transmits the stamp 48 transmitted from the terminal apparatus 10, without conversion into a command, to the printer 31A selected on the terminal apparatus 10, together with the piece of image data (S61).

The image forming condition setting unit 3111 of the printer 31A reads out a command corresponding to the stamp 48 that has been received at S54 from the command storage unit 3131, thereby converting the stamp 48 into the command (S62).

The printer 31A uses the piece of image data to form an image on paper under the image forming condition corresponding to the received stamp 48 (S63). When image formation has been completed, the printer 31A transmits a message indicating that image formation has been completed to the server apparatus 20 (S64). On the other hand, when an error has been generated, the printer 31A transmits a message indicating that effect to the server apparatus 20.

The server apparatus 20 transmits the message received from the printer 31A to the terminal apparatus 10 as a reply message (S65).

The terminal apparatus 10 displays the received reply message on the message display region 41 (S66).

As described above, with the printer 31A according to the present embodiment, the icon selected on the terminal apparatus 10 is transmitted to the printer 31A via the server apparatus 20 and interpreted as the image forming condition in the printer 31A. With this, no unit for interpreting an icon as an image forming condition has to be provided in the server apparatus 20. In the image forming system 1, a server apparatus including no unit for interpreting an icon as an image forming condition thus can be used.

It is to be noted that the characteristics of the present embodiment can be combined with those in the second to the fourth embodiments.

Sixth Embodiment

Figure 18:
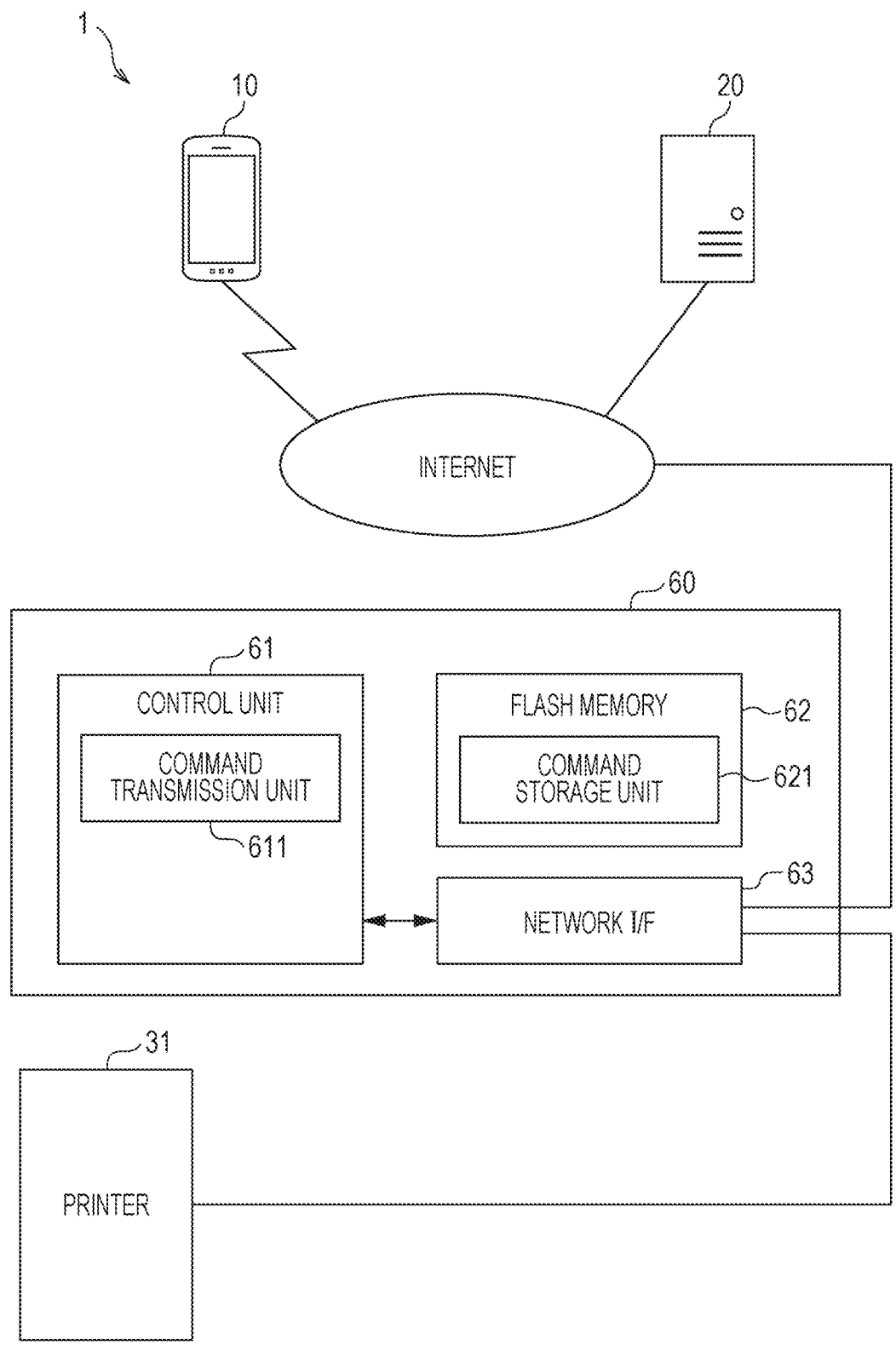
FIG. 18 is a block diagram illustrating a configuration of an information processing apparatus according to a sixth embodiment.

As illustrated in FIG. 18, an information processing apparatus 60 according to a sixth embodiment is connected to the server apparatus 20 that provides a social networking service and the printer 31 that forms an image on paper via a communication line. The information processing apparatus 60 may be provided in each of the printers 31 to 35.

The information processing apparatus 60 includes a control unit 61, a flash memory 62, and a networking interface 63.

The network interface 63 connects the control unit 61 to the Internet and the printer 31, and over the SNS, performs reception of messages and pieces of image data from the server apparatus 20 as well as transmission of commands and pieces of image data to the printer 31, for example.

The flash memory 62 includes a command storage unit 621. The command storage unit 621 stores therein relations between one or more icons and commands each corresponding to a respective one of the icons and including an image forming condition and an image forming instruction.

The control unit 61 includes a command transmission unit 611. When the command transmission unit 611 has received any of the icons and a piece of image data from the server apparatus 20, the command transmission unit 611 reads out a corresponding command corresponding to the received icon from the command storage unit 621 and transmits the corresponding command and the piece of image data to the printer 31 that has been selected on the terminal apparatus 10.

The icon selected on the terminal apparatus 10 is transmitted to the information processing apparatus 60 via the server apparatus 20, the command corresponding to the icon is read out in the information processing apparatus 60, and this command is transmitted to the printer 31. With this, under the image forming condition included in the command, an image based on the piece of image data is formed in the printer 31.

According to the present embodiment, no unit for interpreting an icon as an image forming condition has to be provided in the server apparatus 20 or the printer 31. In the image forming system 1, the server apparatus 20 and the printer 31 that include no unit for interpreting an icon as an image forming condition thus can be used.

It is to be noted that the characteristics of the present embodiment can be combined with those in the second to the fourth embodiments.

It is to be understood that above description on the embodiments is not limitative but exemplary in all respects. The scope of the disclosure is not defined by the embodiments described above but is defined by the appended claims. Further, it is intended that the scope of the disclosure includes equivalents of the claims and all modifications within the scope.

The present disclosure contains subject matter related to that disclosed in Japanese Priority Patent Application JP 2016-136543 filed in the Japan Patent Office on Jul. 11, 2016, the entire contents of which are hereby incorporated by reference.

What is claimed is:

1. An image forming control method implemented in a system in which a terminal apparatus and one or more image forming apparatuses are allowed to communicate with each other using a social networking service provided by a server apparatus, the method comprising:
  enabling selection of an image forming apparatus from among the one or more image forming apparatuses, and accepting the selection of the image forming apparatus at the terminal apparatus;
  enabling selection of a command from among one or more commands including a condition for image formation to be fulfilled by the image forming apparatus selected at the terminal apparatus, and accepting the selection of the command at the terminal apparatus;
  enabling selection of image data to be used for the image formation by the image forming apparatus selected at the terminal apparatus, and accepting the selection of the image data at the terminal apparatus;
  causing the image forming apparatus selected at the terminal apparatus to form an image of the image data selected at the terminal apparatus using the command selected at the terminal apparatus;
  displaying a message display region at the terminal apparatus for showing communication with the image forming apparatus selected after the selection of the image forming apparatus is accepted;
  displaying the command selected at the terminal apparatus along one side of the message display region at the terminal apparatus;
  transmitting the image forming apparatus and the command selected at the terminal apparatus to the server apparatus;
  if the image forming apparatus and the command transmitted from the terminal apparatus are received at the server apparatus, transmitting an inquiry about feasibility of the image formation from the server apparatus to the image forming apparatus selected at the terminal apparatus and received at the server apparatus; and
  displaying an apparatus icon indicating the image forming apparatus selected and a message from the server apparatus indicating a result of the inquiry along another side opposite to the one side of the message display region at the terminal apparatus; wherein
  if the image formation is determined to be feasible in response to the inquiry, the selection of the image data is enabled at the terminal apparatus.

2. The image forming control method according to claim 1, further comprising:
  transmitting the image data selected at the terminal apparatus to the server apparatus.

3. The image forming control method according to claim 1, wherein
  each of the one or more commands has correspondence to one or more command icons, respectively,
  enabling selection of a command icon from among the one or more command icons enables the selection of the command, and
  the selection of the command icon is accepted as the command at the terminal apparatus, the command icon selected is displayed along the one side of the message display region and transmitted to the server apparatus.

4. The image forming control method according to claim 3, wherein
  if the image forming apparatus and the command icon transmitted from the terminal apparatus are received at the server apparatus, the command icon received is temporarily saved to a memory in the server apparatus, and in this state, the inquiry about the feasibility of the image formation is transmitted from the server apparatus to the image forming apparatus received.

5. The image forming control method according to claim 1, wherein
  when the message display region is displayed, if a transmission history is existed, the transmission history is displayed by the message display region.

6. A non-transitory computer readable medium storing an image forming control program implemented in a system in which a terminal apparatus and one or more image forming apparatuses are allowed to communicate with each other using a social networking service provided by a server apparatus, the image forming control program causing the terminal apparatus to execute:
  enabling selection of an image forming apparatus from among the one or more image forming apparatuses, and accepting the selection of the image forming apparatus at the terminal apparatus;
  enabling selection of a command from among one or more commands including a condition for image formation to be fulfilled by the image forming apparatus selected at the terminal apparatus, and accepting the selection of the command at the terminal apparatus;

enabling selection of image data to be used for the image formation by the image forming apparatus selected at the terminal apparatus and accepting the selection of the image data at the terminal apparatus;

displaying a message display region at the terminal apparatus for showing communication with the image forming apparatus selected after the selection of the image forming apparatus is accepted;

displaying the command selected at the terminal apparatus along one side of the message display region at the terminal apparatus;

transmitting the image forming apparatus and the command selected at the terminal apparatus to the server apparatus;

after receiving a result of an inquiry which is about feasibility of the image formation made by the image forming apparatus selected from the server apparatus, displaying an apparatus icon indicating the image forming apparatus selected and a message from the server apparatus indicating the result of the inquiry along another side opposite to the one side of the message display region at the terminal apparatus; and if the image formation is determined to be feasible in response to the inquiry, enabling the selection of the image data at the terminal apparatus.

* * * * *